United States Patent
Monereau et al.

(10) Patent No.: US 6,402,813 B2
(45) Date of Patent: Jun. 11, 2002

(54) PROCESS FOR PURIFYING A GAS BY ADSORPTION OF THE IMPURITIES ON SEVERAL ACTIVE CARBONS

(75) Inventors: Christian Monereau; Serge Moreau, both of Paris (FR)

(73) Assignee: L'Air Liquide, Societe Anonyme a Directoire ét Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/753,660

(22) Filed: Jan. 4, 2001

(30) Foreign Application Priority Data

Jan. 25, 2000 (FR) .............................................. 00 00948

(51) Int. Cl.⁷ .............................................. B01D 53/04
(52) U.S. Cl. ............................... 95/96; 95/139; 95/141; 95/117; 95/901
(58) Field of Search ............................ 95/96–103, 117, 95/121, 139–143, 901; 96/132, 131; 502/180, 416, 417; 423/248

(56) References Cited

U.S. PATENT DOCUMENTS

| | | | |
|---|---|---|---|
| 4,931,071 A | 6/1990 | Kaplan et al. | |
| 5,198,001 A | * 3/1993 | Knebel et al. | ................. 95/141 |
| 5,275,640 A | 1/1994 | Heimbach Heinrich et al. | ............... 95/138 |
| 5,505,764 A | 4/1996 | Fuentes | ........................ 95/139 |
| 5,726,118 A | 3/1998 | Ivey et al. | .................. 502/416 |
| 6,129,780 A | * 10/2000 | Millet et al. | .................... 95/117 |

FOREIGN PATENT DOCUMENTS

| EP | 1076035 A | * | 2/2001 |
| JP | 401099627 A | * | 4/1989 |
| JP | 07039712 A | * | 2/1995 |

* cited by examiner

Primary Examiner—David A. Simmons
Assistant Examiner—Frank M. Lawrence
(74) Attorney, Agent, or Firm—Young & Thompson

(57) ABSTRACT

The gas stream containing one or more gaseous impurities from the group formed by carbon dioxide, water vapor, $H_2S$, alcohols, $SO_2$ and $C_1$–$C_8$ saturated or unsaturated, linear, branched or cyclic hydrocarbons is brought into contact with several different porous carbon adsorbents, that is to say active carbons having different properties and characteristics. The gas is air, nitrogen, hydrogen produced by the reforming or cracking of ammonia or the combustion gas or fermentation gas.

15 Claims, 1 Drawing Sheet

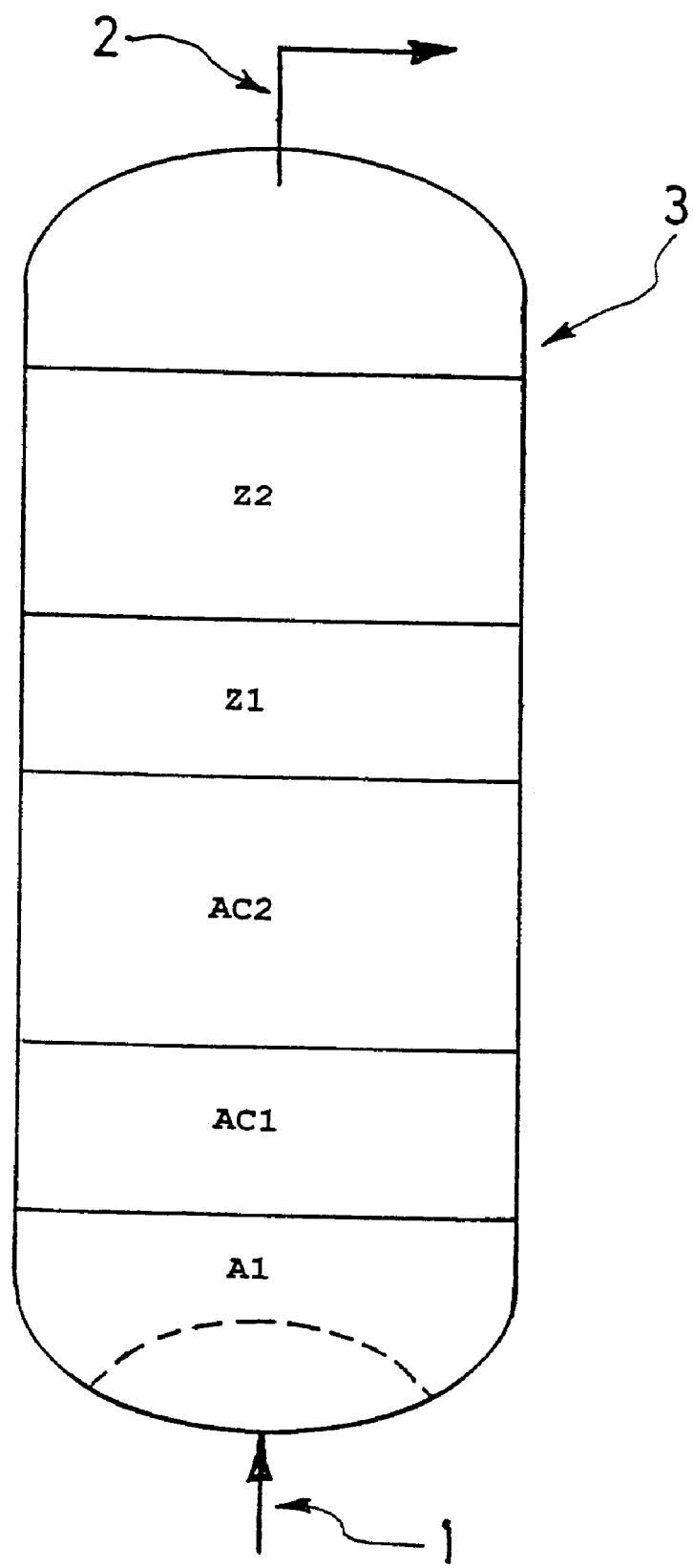

PROCESS FOR PURIFYING A GAS BY ADSORPTION OF THE IMPURITIES ON SEVERAL ACTIVE CARBONS

FIELD OF THE INVENTION

The present invention relates to the field of the purification of a gas or gas mixture by adsorption of the impurities which are contained therein on a carbon adsorbent formed by a combination of several different active carbons, in particular a PSA process for purifying a gas, such as hydrogen, nitrogen, oxygen, carbon monoxide, argon, methane or gas mixtures containing them.

BACKGROUND OF THE INVENTION

A PSA (Pressure Swing Adsorption) unit for purifying a gas usually contains an adsorbent or a combination of adsorbents which has to be capable of selectively retaining the impurities contained in the gas to be treated.

PSA processes and units have proved to be highly effective for separating gas mixtures and especially for obtaining oxygen or nitrogen from air and above all for producing pure hydrogen from gas mixtures contaminated by various impurities.

Now, the production of high-purity hydrogen is of great importance industrially, it being widely used in many synthesis processes such as hydrocracking, methanol production, oxoalcohol production and isomerization processes.

In general, PSA processes benefit from the adsorption selectivity of a given adsorbent for one or more of the contaminating substances in the gas mixture to be purified.

Thus, in the case of hydrogen purification, the impurities that usually have to be removed are: water vapour; $CO_2$, CO, nitrogen, saturated or unsaturated, linear, branched or cyclic hydrocarbons containing one or more carbon atoms in their hydrocarbon structure, for example $C_1$–$C_8$ compounds, such as $CH_4$, $C_2H_4$, $C_2H_6$, $C_3H_8$, BTX (benzene-toluene-xylene) compounds; mercaptans; $H_2S$; $SO_2$, chlorine, ammonia, amines; alcohols, for example $C_1$–$C_3$ light alcohols; other volatile organic compounds, such as esters, ethers and halogenated compounds.

These compounds are generally removed by a number of adsorbents, that is to say layers of adsorbents placed in series. Thus, it is conventional to use alumina or silica gel to retain, in particular, water vapour; activated carbon for retaining, in particular, hydrocarbons, $CO_2$ and water vapour; and zeolite for removing barely adsorbable impurities such as CO and nitrogen.

Usually the adsorbents are placed in a single adsorber but more usually in several adsorbers operating in alternation.

The proportion of the various adsorbents within the composite adsorbent bed depends on the composition of the gas to be treated and on the pressure, and there are therefore many possible combinations of composite adsorbents.

Usually, an $H_2$ PSA unit employs, within each adsorber, a pressure cycle comprising, schematically:
- an approximately isobaric production phase at the high pressure of the adsorption cycle;
- an adsorbent regeneration phase comprising at least one cocurrent decompression step by pressure equalization with another adsorber; a final, countercurrent depressurization step with discharge of waste gas; and generally an elution step at the low pressure of the cycle, the eluting gas generally coming from a second cocurrent decompression step of an adsorber; and
- a repressurization phase comprising at least one step of pressure equalization with another adsorber and a final recompression step by means of production gas.

In general, the cycles may include several, total or partial, equalization steps, preferably from 1 to 4 equalization steps. Gas transfers can take place directly from adsorber to adsorber or via one or more gas storage tanks. The steps of recompression by equalization and of recompression by production gas may or may not be at least partially simultaneous and may optionally include a partial repressurization via a gas feed. Complementary purging steps may be introduced, particularly if it is desired to recover, for reutilization, another fraction other than hydrogen from the gas to be treated. In addition, the cycle may also include standby times during which the adsorbers are isolated.

Conventionally, the adsorption pressure is between 5 bar and 70 bar, preferably between 15 bar and 40 bar; the desorption pressure is between 0.1 bar and 10 bar, preferably between 1 and 5 bar; and the temperature of the stream of hydrogen to be purified is between −25° C. and +60° C., preferably between +5° C. and +35° C.

Moreover, this is illustrated, for example, by the documents U.S. Pat. No. 3,702,525, U.S. Pat. No. 3,986,849, U.S. Pat. No. 4,077,779, U.S. Pat. No. 4,153,428, U.S. Pat. No. 4,696,680, U.S. Pat. No. 4,813,980, U.S. Pat. No. 4,963,339, U.S. Pat. No. 3,430,418, U.S. Pat. No. 5,096,470, U.S. Pat. No. 5,133,785, U.S. Pat. No. 5,234,472, U.S. Pat. No. 5,354,346, U.S. Pat. No. 5,294,247 and U.S. Pat. No. 5,505,764, which describe PSA process operating cycles for producing hydrogen.

The impurities are removed by one or more adsorbents placed in series from the upstream end of the adsorber, that is to say the side where the gases to be treated enter the said adsorber. In general, the choice and the proportion of adsorbent(s) to be used depend on the nature or composition of the gas mixture to be treated and on the pressure.

Furthermore, mention may be made of document WO-A-97/45363 which relates to a process for the purification of hydrogen-based gas mixtures polluted by various impurities, including carbon monoxide and at least one other impurity chosen from among carbon dioxide and $C_1$–$C_8$ saturated or unsaturated, linear, branched or cyclic hydrocarbons. The gas stream to be purified is brought into contact, in an adsorption zone, with a first adsorbent selective with respect to carbon dioxide and to $C_1$–$C_8$ hydrocarbons and with a second adsorbent which is a faujasite-type zeolite exchanged to at least 80% with lithium and the Si/Al ratio of which is less than 1.5, in order to remove at least the carbon monoxide (CO). According to this document, the improvement made by the process is due to the use of a particularly effective zeolite, namely an X zeolite exchanged with lithium.

As regards document U.S. Pat. No. 3,150,942, this teaches the use of a zeolite containing sodium cations or sodium and calcium cations in order to purify a stream of hydrogen.

Similarly, document U.S. Pat. No. 4,477,267 describes a process for purifying hydrogen which uses an X zeolite exchanged to from 70 to 90% with calcium cations and also containing an inert binder.

Document U.S. Pat. No. 4,957,514 discloses a process for purifying hydrogen employing an X zeolite exchanged to from 60 to 80% with barium cations.

Furthermore, document U.S. Pat. No. 5,489,327 relates to the purification of gaseous hydrogen by bringing it into contact with a hydride of a zirconium alloy.

Finally, document JP-A-860146024 describes a PSA process for purifying impure gases using a mordenite-type zeolite exchanged with lithium, on the production side, and another zeolite, on the feed side.

On the other hand, certain documents point out that the adsorbent or adsorbents used in a PSA process for purifying hydrogen are of little, or even no importance.

Thus, the document by D. M. Ruthvens, S. Farooq and K. S. Knaebel <<Pressure Swing Adsorption>>, 1994 published by VCH, teaches, on page 238, that <<*since the selectivity for most impurities is high compared with that for hydrogen, any adsorbent can be used*>>to purify hydrogen.

Similarly, according to document U.S. Pat. No. 4,299,596, any conventional adsorbent can be used to produce hydrogen, for example active carbons, silica gels, molecular sieves, such as zeolites, carbon screens, etc.

Moreover, document U.S. Pat. No. 4,482,361 mentions the possibility of using whatever suitable adsorbent, such as zeolitic molecular sieves, active carbons, silica gels, activated aluminas or similar materials.

Likewise, document U.S. Pat. No. 4,834,780 teaches that the adsorption can be carried out in all cases where an adsorbent has been selected so as to be suitable for the separation process in question, for example active carbons, silica gels, aluminas or molecular sieves.

Moreover, document U.S. Pat. No. 5,275,640 teaches the production of nitrogen from air by a PSA/VSA process with two successive carbon adsorbent beds intended to remove water vapour from the stream of feed air.

Furthermore, document U.S. Pat. No. 5,726,118 proposes a composite adsorbent formed from an intimate mixture of several different active carbons which can be used in a PSA, TSA or VSA process to separate various liquids or gases, especially oxygen and hydrogen.

In general, not one of these documents emphasizes the importance of the choice of active carbon to be used, nor does it emphasize or specify the characteristics that the bed or beds of active carbon must have so that the gas to be treated is purified efficiently.

Based on this, the problem that then arises is how to improve the PSA processes for gas purification, particularly hydrogen purification, that is to say improve the efficiency of the removal of the impurities contained in a stream of gas, such as hydrogen, to be purified.

SUMMARY OF THE INVENTION

The invention therefore relates to a process for the purification of a gas stream containing at least one gaseous impurity chosen from the group formed by $CO_2$, saturated or unsaturated, linear, branched or cyclic hydrocarbons containing at least one carbon atom in their hydrocarbon structure, mercaptans, $H_2S$, $SO_2$, chlorine, ammonia, alcohols, amines and volatile organic compounds, in which the gas stream to be purified is brought successively into contact with particles of a first porous carbon adsorbent and with particles of a second porous carbon adsorbent, the particles of the said first and second porous carbon adsorbents forming separate and successive layers, and in which the particles of the said first porous carbon adsorbent are defined by a first density (D1), a first specific surface area (SSA1) and a first mean pore size (MPS1) and the particles of the said second porous carbon adsorbent are defined by a second density (D2), a second specific surface area (SSA2) and a second mean pore size (MPS2), such that at least one of the following formulae (1) to (3) is satisfied:

$$D1<D2 \quad (1)$$

$$SSA1>SSA2 \quad (2)$$

$$MPS1>MPS2 \quad (3).$$

Depending on the case, the process of the invention may also include one or more of the following characteristics:

the particles of the said first porous carbon adsorbent are defined by a first pore volume (PV1) and the particles of the said second porous carbon adsorbent are defined by a second pore volume (PV2), the first pore volume (PV1) and the second pore volume (PV2) being such that the following formula (4) is satisfied:

$$PV1>PV2 \quad (4);$$

the particles of the first porous carbon adsorbent and the particles of the second porous carbon adsorbent are inserted within the same adsorber, as separate and successive layers;

the ratio of the volume of particles of the first porous carbon adsorbent to the volume of particles of the second porous carbon adsorbent is between 5/95 and 95/5, preferably between 5/95 and 20/80;

the first and second porous carbon adsorbents are chosen from among active carbons, preferably active carbons produced from coconut husk, peat, lignite, coal, anthracite, polymers or resins. When the first carbon adsorbent is obtained from the same precursor material as the second carbon adsorbent, the said first carbon adsorbent then preferably has a higher degree of activation than the said second carbon adsorbent;

the gas stream is furthermore brought into contact with at least one zeolitic particulate adsorbent, preferably the contacting of the gas stream with the zeolite particles taking place subsequently to the contacting of the said gas stream with the particles of the said first and second porous carbon adsorbents;

the zeolite is a zeolite of the X or A type or a faujasite, exchanged to at least 70% with lithium or with calcium, and/or a zeolite of the faujasite type whose Si/Al ratio is between about 1 and 1.2;

the gas stream is furthermore brought into contact with at least one adsorbent formed from particles of activated alumina or of silica gel, preferably the contacting of the gas stream with the particles of activated alumina or of silica gel taking place prior to the contacting of the said gas stream with the particles of the said first and second porous carbon adsorbents;

it is of the PSA or TSA type and preferably comprises from 2 to 12 adsorbers. Optionally, the adsorber or adsorbers may be regenerated by means of a hot fluid other than the gas to be treated or other than a stream produced in the adsorption unit, such as water vapour;

the gas stream is a hydrogen stream, in particular a synthesis gas coming from the reforming or the cracking of hydrocarbons or of alcohols, such as methanol, or from the gasification of solid carbon products;

the gas stream is a stream of air or nitrogen;

the particles of the first porous carbon adsorbent are defined by: a first pore volume (PV1) where PV1 is between 0.5 and 1.5 $cm^3/g$; a first density (D1) of between 350 and 500 $kg/m^3$; a first specific surface area (SSA1) of between 500 and 1800 $m^2/g$, preferably between 800 and 1500 $m^2/g$; and a first mean pore size (MPS1) where MPS1>6 ångströms, preferably between 7 and 15 ångströms;

the particles of the second porous carbon adsorbent are defined by: a second pore volume (PV2) where PV2 is between 0.4 and 1.3 $cm^3/g$; a second density (D2) of between 400 and 650 kg/g$^3$; a second specific surface area (SSA2) of between 400 and 1500 m$^2$/g, preferably between 600 and 1200 m$^2$/g, and a second mean pore size (MPS2) where MPS2>4 ångströms, preferably between 5 and 11 ångströms;

the particles of the said first and second porous carbon adsorbents have different mean particle sizes, preferably the particle size of the first porous carbon adsorbent is between 2 mm and 5 mm and/or the particle size of the second porous carbon adsorbent is between 1 mm and 3 mm;

the gas is natural gas, a combustion gas or a fermentation gas;

the adsorption pressure is between 5 bar and 70 bar, preferably between 15 bar and 40 bar;

the desorption pressure is between 0.1 bar and 10 bar, preferably between 1 and 5 bar;

the temperature of the stream of hydrogen to be purified is between −25° C. and +60° C., preferably between +5° C. and +35° C.;

the porous carbon adsorbent has pores having a size of between 0.4 nm and 4 nm, preferably between 0.5 nm and 2 nm;

it is of the PSA type, having several adsorbers, preferably from 3 to 12 adsorbers;

the stream of gas to be purified furthermore contains water vapour as gaseous impurity.

Now, the inventors of the present invention have shown that, surprisingly, an appreciable improvement in the efficiency of a PSA process for purifying a gas, particularly a stream of hydrogen, of the impurities that it contains can be achieved by judiciously choosing the various layers of carbon adsorbents, that is to say active carbons, used in the PSA process.

This is because, although it is commonplace to use active carbon particles to remove certain impurities contained in hydrogen streams, it has never hitherto been demonstrated that the succession of two microporous active carbons having different pore volumes, different densities, different specific surface areas and/or different mean pore sizes has an appreciable effect on the performance of a PSA-type adsorption process for purifying or separating a gas stream, particularly a hydrogen gas stream.

The active carbons according to the present invention are defined by the method or theory proposed by M. M. Dubunin (see, for example, F. Stoeckli and D. Morel: *Chimia* 34 (1980) No. 12 (December) or else M. M. Dubinin, *Carbon*, Vol. 26, No. 1, page 97, (1988).

BRIEF DESCRIPTION OF THE DRAWINGS

EXAMPLE

The appended FIGURE shows the diagram of one of the adsorbers of a PSA hydrogen purification unit according to the invention, the said PSA unit comprising from 3 to 12 adsorbers (not detailed) arranged in parallel.

DETAILED DESCRIPTION OF THE DRAWINGS

As may be seen in the FIGURE, the stream of hydrogen to be purified, entering the adsorber 3 (at 1), is brought into contact, successively and in this order, with:

a layer of alumina particles A1;

a layer of particles of the first active carbon (AC1) according to the invention;

a layer of particles of the second active carbon (AC2) according to the invention;

a layer of particles of a first zeolite (Z1), for example a 13X, Na-LSX or Li-LSX zeolite, and a layer of particles of a second zeolite (Z2), for example a CaX, 5A, CaLSX or BaLSX zeolite.

These various layers of adsorbents are used to remove the impurities contained in the stream of hydrogen to be purified, the purified hydrogen then being recovered on the outlet side (at 2) of the adsorber 3.

More specifically, the process of the invention was validated on a synthesis gas, that is to say a stream of gas to be purified which is composed of about 73% $H_2$, 24% $CO_2$ and 2% CO, coming from a methanol vapour reforming operation, as described especially in documents EP-A-456 544 or EP-A-365 387. This gas stream also contains about 500 ppm to 1% of other impurities, such as water vapour, methane and alcohol vapours.

The basic cycle of each of the adsorbers of the PSA process employed can be split into four main phases, each comprising one or more steps:

Phase 1: production phase;

Phase 2: depressurization phase (equalization and depressurization for elution);

Phase 3: purge and elution phase;

Phase 4: recompression phase (recompression by equalization and final recompression).

The cycle is characterized by an adsorption pressure of 26 bar and a low pressure of 1.6 bar.

The thermal power needed to obtain the synthesis gas from methanol and liquid water is provided by burning the waste gas which is used for this purpose.

The design and yield of the PSA process were determined from a pilot unit fed with the same reconstituted synthesis gas but free of all other impurities.

For this purpose, a first trial was carried out with an adsorbent consisting of a layer of active carbon representing 75% of the total volume of adsorbent and of a layer of zeolite 5A representing 25% of the total volume of adsorbent, this 3/1 ratio having been found to be optimum.

Thereafter, the adsorbents used in this volume ratio were employed in an industrial PSA unit.

After several production cycles, it was found that, for the industrial unit in question, the hydrogen yield obtained was markedly less than that expected and, after analysis, it was found that a large amount of alcohol had accumulated in the bed of active carbon, particularly in its lower part.

Combining these two observations led to replacing about 10% of the active carbon layer with another active carbon having a pore volume and/or pore size greater than the active carbon used in the first trial.

In other words, a second trial was carried out under the same conditions, but using a composite bed comprising, in succession, from the inlet side to the outlet side of the adsorber, a layer of active carbon having a higher pore volume (10% by volume), a layer of active carbon identical to that of the previous trial (65% by volume) and a layer of zeolite 5A identical to that of the previous trial (25% by volume).

After several production cycles, it was found that the hydrogen yield obtained in this second trial was equal to that expected from the pilot results and, in all cases, markedly higher by several per cent than the yield obtained in the previous trial on the industrial unit.

Complementary trials have shown that replacing all of the layer of active carbon used in the first trial with a layer of active carbon having a higher pore volume, as used in the second trial, led to an appreciable reduction in the performance of the PSA unit, which tends to show that it is clearly the succession of the two types of different active carbons according to the present invention which allows the yield of the PSA hydrogen purification unit to be improved.

It therefore seems that, although it is possible to produce pure hydrogen with any of the active carbons, there is an unquestionable advantage, particularly in terms of yield, in using the two active carbons of different nature together.

This may be explained by the fact that the layer of active carbon having a higher pore volume and/or pore size allows better desorption of the heavier impurities, such as the alcohol vapours and BTXs, during the PSA adsorbent regeneration phases.

Now, the common preoccupation at the basis of any PSA process is to be able to use adsorbents having a high adsorbtivity at high pressure and, at the same time, leading to a large variation in adsorbtivity between the high and low pressures of the cycle.

However, these two constraints are difficult to reconcile since, in general, when the high-pressure adsorbtivity increases, the isotherm of the adsorbent in question curves over at the same time, resulting in a reduction in the adsorption differential.

Among the various active carbons commercially available, it has been found that the active carbons which efficiently adsorb the light compounds, such as $CH_4$, adsorb the heavy compounds, such as alcohols and BTXs, excessively whereas, conversely, the active carbons which adsorb the heavy compounds in an industrially acceptable way, that is to say which allow them to be desorbed, do not adsorb the light compounds sufficiently.

Therefore, if, (as in the first trial) a single active carbon is used to adsorb all the compounds, this leads to a situation in which the least adsorbable substances have a low high-pressure adsorbtivity, whereas the most easily adsorbable substances have a curved isotherm which corresponds to poor desorption.

In practice, this results in a situation in which the single bed of active carbon will, depending on its intrinsic characteristics, either be poisoned by the non-desorbable heavy products if it is tailored towards light products, or will have to be overdesigned in order to adsorb the barely adsorbable light compounds, when it is more tailored towards heavy products.

In both cases, this leads to a reduction in performance—a drop in capacity for lack of adsorbent and a drop in yield because of the hydrogen found in the poised zoned and lost during the purge in the first scenario, and a drop in yield, particularly through an increase in the interstitial free volume, in the second scenario.

The use of several layers or beds of active carbons of different types according to the present invention makes it possible to solve this adsorption/desorption problem for all the compounds present in the gas to be treated, by gradually removing all the compounds or impurities present in the gas to be purified and to do so starting with the heavy compounds, and therefore letting most of the lighter compounds through, the gas purified of the said heavy compounds then being brought into contact with an adsorbent capable of adsorbing/desorbing the light compounds well. It goes without saying that, in some cases, more than two beds of active carbons will be necessary, particularly when the gas stream to be purified is a complex mixture, that is to say one comprising a number of different gaseous compounds.

Thus, the above trials clearly demonstrate that the use of several layers of active carbons having different characteristics according to the present invention leads to an improvement in the yield of the PSA process and to a reduction in the total volume of adsorbent.

Although the trials that led to the invention were carried out on an $H_2$ PSA unit, the principle of the invention applies whenever active carbon is used to purify a stream of gas containing various impurities of different type. Mention may be made, for example but not limitingly, of the purification of $CO_2$ from a combustion or fermentation gas, or else of the recovery of methane and $CO_2$ from natural gas.

For example, mention may be made of document U.S. Pat. No. 4,840,647 which describes a process of the first type in which a one and only bed of active carbon is used to purify the gas, or else document U.S. Pat. No. 4,770,676 corresponding to the second type of process mentioned and employing several beds of adsorbent, particularly of active carbon, both in the pretreatment and the PSA itself. This document provides no information regarding the characteristics of the active carbon or carbons employed.

Likewise, depending on the partial pressure of an impurity in a gas to be purified, one may be prompted to use such or such an active carbon better suited to the operating conditions. Within the context of the invention, it may be advantageous, even for a single impurity, to provide two or more beds of active carbons having different characteristics, the first one, upstream, being exposed to the total partial pressure and the last one, downstream of the adsorbent bed, being exposed only to traces of contaminants.

Similarly, the impurities may be desorbed simply as a result of reducing the pressure, as in the case of an $H_2$ PSA cycle, or by raising the temperature. In the latter case, it will be understood that the use of two different active carbons can facilitate the desorption of the heaviest compounds on the first active carbon while still having good adsorptivities on the second active carbon with respect to more volatile contaminants.

Within the context of the present invention, commercially available active carbons may be used as long as they satisfy the conditions demonstrated by the present invention, or active carbons specifically manufactured for such or such a use.

In all cases, an active carbon is usually prepared from one or more precursors, such as peat, coke, anthracite, coal, tree bark, fruit stones or plant husks, for example from coconuts, almonds etc.

The precursor is firstly treated so as to remove the impurities therefrom, reduced to the appropriate dimensions, activated, possibly ground and then extruded using a carbon-based binder, for example pitch.

In the case of physical carbons, the precursor is subjected to a so-called carbonization operation during which the water and the volatile organic matter, the aliphatic, unsaturated or aromatic compounds, these possibly containing oxygen, sulphur or nitrogen, are removed so as to obtain a non-volatile, essentially carbon-based residual skeleton (carbonizate) consisting of a porous, possibly partially open, structure with more or less amorphous regions. The final structure depends on the starting material, on its chemical structure and composition, on the treatment performed, on the heating rate and on the final temperature. Next, the carbon structure is subjected to an activation step during which it is chemically etched in a controlled manner for the purpose of creating an open internal porosity of defined pore size and pore volume. The activation step may be carried out by oxidation using air, carbon dioxide or steam. During this activation step, some of the carbon material of the carbon structure is removed in the form of gas and the open porosity consequently increases, thereby allowing the accessible pore volume and the mean pore size to increase. The final structure depends on the precursor and on the carbonizate.

In the case of chemical carbons, the precursor is brought into contact, by impregnation, with a chemical reactant, such as NaOH, KOH, $ZnCl_2$ or $H_3PO_4$, and the mixture thus obtained is heated to a temperature of at least 500° C. in order for the precursor to be etched by the chemical reactant and for the porosity to be thus created. Next, the product is cooled to a temperature of usually less than 100° C., washed and possibly neutralized with an alkaline or acid solution, in order to remove therefrom the reaction products, and finally dried.

In all cases, the final structure depends on the starting material, on its carbonization and on its activation.

The quantitative determination of the porous structure may be characterized by an example using the specific surface area according to the BET method given in *J. Am. Chem. Soc.*, Vol. 60, 1938, p. 309, the micropore volume according to the Dubinin theory mentioned in *Chem. Rev.*, Vol. 60, 1960, pp. 235-41, the pore size from the Dubinin theory in *Carbon*, 1988, Vol. 26, p. 97, or the pore size distribution by an extension of the Dubinin method, as explained in *Carbon*, 1988, Vol. 26, p. 6 or *Carbon*, 1985, Vol. 23, p. 373.

Thus, if the differential pore size distribution is known, for example by considering pores smaller than a value $d_1$, pores between the value $d_1$ and the value $d_2$, pores between the value $d_2$ and the value $d_3$, ... etc ... and pores greater than a value $d_n$, and their respective percentages by volume, $V_1$, $V_2$, $V_3$ ... $v_n$, the mean pore size MPS is then defined as follows:

$$MPS=((v_1 d_i)+(0.5v_2(d_1+d_2))+(0.5v_3(d_2+d_3))+ \ldots v_{n+1}d_n))/(v_1+v_2 \ldots +v_{n+1})$$

The differential pore distribution may also be obtained in a continuous form d(r) and, in this case, the equation which gives the MPS is an integral equation:

$$MPS = \frac{\int_0^\infty d(r) \times r \times dr}{\int_0^\infty d(r) \times dr}$$

A person skilled in the art knows that the pore structure evolves in a complex manner according to the degree of carbonization, that is to say to the amount of carbon removed by activation, as explained by T. Wigmans in <<*Activated carbon, a fascinating material*>>, Ed. Capelle & de Vooys, 1983, pp. 58–80. In general, the first carbon adsorbent, if it is obtained from the same starting material and activated using the same method, will have a greater degree of activation than the second.

For example, the invention can be implemented by using two active carbons sold by Norit under the reference names RX and RB, which have the characteristics given in the following table.

TABLE

|  | Active carbon RX | Active carbon RB |
| --- | --- | --- |
| Density ($kg/m^3$) | 410 | 460 |
| Micropores <1 nm ($cm^3/g$) | 0.48 | 0.36 |
| Transition pores >1 nm and <100 nm ($cm^3/g$) | 0.09 | 0.08 |
| Macropores >100 nm ($cm^3/g$) | 0.47 | 0.41 |
| Total pore volume ($cm^3/g$) | 1.04 | 0.85 |
| BET specific surface area ($m^2/g$) | 1250 | 1000 |

In general, it is not necessary for the two successive layers of different active carbons to be immediately in contact with each other—they may be spaced apart or even possibly separated from each other by an adsorbent of a different type, that is to say an adsorbent sandwiched between two layers of different active carbons.

Furthermore, the change in the physical characteristics may be gradual, that is to say obtained by mixing various active carbons in variable proportions.

Likewise, the form and the particle size distribution of the various layers of active carbons may be identical or different and the said various layers of active carbons may be placed in separate containers, even though it is preferred to place them within the same adsorber.

The invention is not limited to the purification of hydrogen but also applies to the purification of other gases, particularly air, nitrogen, CO, $CH_4$ and $CO_2$ provided that the impurities to be stopped have sufficiently different adsorption characteristics with respect to the carbon.

What is claimed is:

1. A process for the purification of a gas stream containing at least one gaseous impurity selected from the group consisting of $CO_2$, saturated and unsaturated, linear, branched and cyclic hydrocarbons containing at least one carbon atom in their hydrocarbon structure, mercaptans, $H_2S$, $SO_2$, chlorine, ammonia, alcohols, amines and volatile organic compounds, the process comprising:

bringing the gas stream to be purified successively into contact with particles of a first porous carbon adsorbent, and then with particles of a second porous carbon adsorbent, the particles of the first and second porous carbon adsorbents forming separate and successive layers to remove at least one gaseous impurity on the separate and successive layers of porous carbon adsorbents, and wherein the particles of the first porous carbon adsorbent are defined by a first density (D1) and a first specific surface area (SSA1) and the particles of the second porous carbon adsorbent are defined by a second density (D2) and a second specific surface area (SSA2) such that:

D1<D2     (1)

and

SSA1>SSA2     (2)

and wherein the particles of the first porous carbon adsorbent are further defined by at least one of a first mean pore size (MPS1) and a first pore volume (PV1), and the particles of the second porous carbon adsorbent are defined by at least one of a second mean pore size (MPS2) and a second pore volume (PV2), such that:

$$MPS1>MPS2 \tag{3}$$

and/or $$PV1>PV2. \tag{4}$$

2. The process according to claim 1, wherein the ratio of the volume of particles of the first porous carbon adsorbent to the volume of particles of the second porous carbon adsorbent is between 5/95 and 95/5.

3. The process according to claim 1, wherein the first and second porous carbon adsorbents are selected from among active carbons, produced from at least one element selected from the group consisting of coconut husk, peat, lignite, coal, anthracite, polymers and resins.

4. The process according to claim 1, further comprising bringing the gas stream into contact with at least one zeolitic particulate adsorbent.

5. The process according to claim 4, wherein the zeolite is a X zeolite, an A zeolite or a faujasite, exchanged to at least 70% with lithium or with calcium, and/or a faujasite whose Si/Al ratio is between about 1 and 1.2.

6. The process according to claim 1, further comprising bringing the gas stream into contact with at least one adsorbent formed from particles of activated alumina or of silica gel.

7. The process according to claim 1, wherein the adsorbents are present in a PSA or TSA unit.

8. The process according to claim 1, wherein the gas stream is a hydrogen stream.

9. The process according to claim 1, wherein the gas stream is an air stream or nitrogen stream.

10. The process according to claim 1, wherein the particles of the first porous carbon adsorbent are defined by:
    a first pore volume (PV1) of between 0.5 and 1.5 $cm^3/g$;
    a first density (D1) of between 350 and 500 $kg/m^3$;
    a first specific surface area (SSA1) of between 500 and 1800 $m^2/g$; and
    a first mean pore size (MPS1)>6 angstroms.

11. The process according to claim 1, wherein the particles of the second porous carbon adsorbent are defined by:
    a second pore volume (PV2) of between 0.4 and 1.3 $cm^3/g$;
    a second density (D2) of between 400 and 650 $kg/m^3$;
    a second specific surface area (SSA2) of between 400 and 1500 $m^2/g$; and
    a second mean pore size (MPS2)>4 angstroms.

12. The process according to claim 1, wherein the particles of the first and second porous carbon adsorbents have different mean particle sizes.

13. The process according to claim 1, wherein the gas is natural gas, a combustion gas or a fermentation gas.

14. The process according to claim 1, wherein the particles of the first and second porous carbon adsorbents form separate and successive layers within a single unit.

15. A process for the purification of a gas stream containing water vapor as a gaseous impurity and at least one other gaseous impurity selected from the group consisting of $CO_2$, saturated and unsaturated, linear, branched and cyclic hydrocarbons containing at least one carbon atom in their hydrocarbon structure, mercaptans, $H_2S$, $SO_2$, chlorine, ammonia, alcohols amines and volatile organic compounds, the process comprising:
    bringing the gas stream to be purified successively into contact with particles of a first porous carbon adsorbent and then with particles of a second porous carbon adsorbent, the particles of the first and second porous carbon adsorbents forming separate and successive layers for removing at least one gaseous impurity on the separate and successive layers of porous carbon adsorbents, and
    wherein the praticles of the first porous carbon adsorbent are defined by a first density (D1)and a first specific surface area (SSA1) and the particles of the second porous carbon adsorbent are defined by a second density (D2) and a second specific surface area (SSA2) such that:

$$D1<D2 \tag{1}$$

and $$SSA1>SSA2 \tag{2}$$

and wherein the particles of the first porous carbon adsorbent are further defined by at least one of a first mean pore size (MPS1) and a first pore volume (PV1), and the particles of the second porous carbon adsorbent are defined by at least one of a second mean pore size (MPS2) and a second pore volume (PV2), such that:

$$MPS1<MPS2 \tag{3}$$

and/or $$PV1>PV2. \tag{4}$$

* * * * *